Feb. 9, 1965   L. L. GEDNALSKE   3,168,789
FISHING RIG FOR ICE FISHING
Filed Oct. 16, 1962
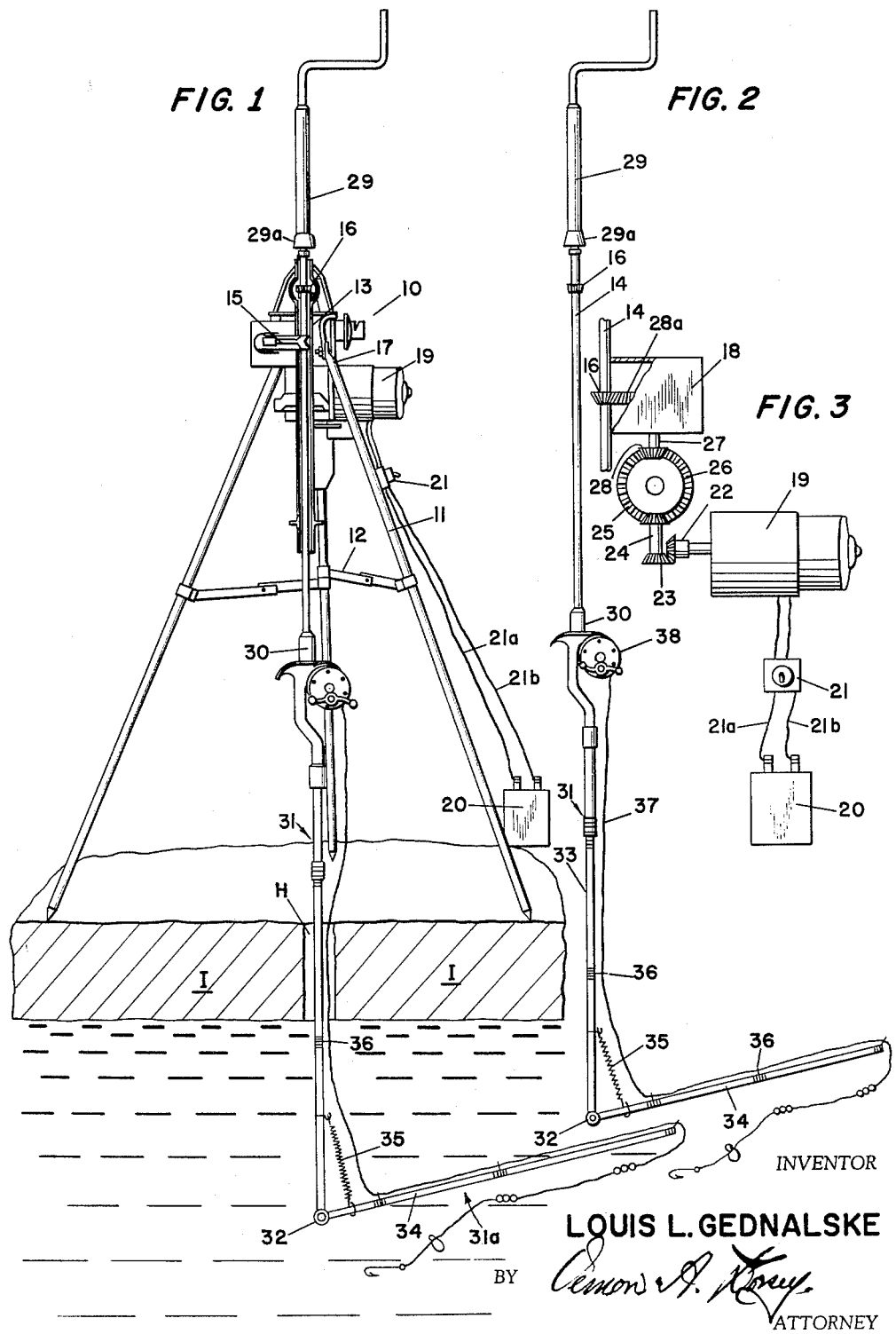
INVENTOR
LOUIS L. GEDNALSKE
BY
ATTORNEY

United States Patent Office 3,168,789
Patented Feb. 9, 1965

3,168,789
FISHING RIG FOR ICE FISHING
Louis L. Gednalske, Dell Rapids, S. Dak.
Filed Oct. 16, 1962, Ser. No. 230,894
3 Claims. (Cl. 43—19.2)

This invention relates to a fishing rig for use in fishing through holes in the ice.

One of the objects of the present invention is to provide a fishing rig which moves the fishing lure or bait beneath the ice in a continuous circular path at a fixed rate, either by an electric motor or through a crank operated by hand.

Another object of the invention is to provide an ice fishing apparatus of simple construction having a minimum of fool-proof parts and which is sturdy and operates freely through a hole in the ice.

For a better understanding of the invention, reference should be made to the following detailed description, taken in connection with the accompanying drawings, in which—

FIG. 1 is a perspective view of an ice fishing rig including a fishing tackle assembly made in accordance with the present invention.

FIG. 2 is a fragmental side elevational view of the fishing rod and the drive extension therefor, shown in FIG. 1.

FIG. 3 is an enlarged fragmental side elevational view, partly in section, showing the motor and reduction gear forming the electrical motive force for the fishing tackle.

Referring more in detail to the drawings, the ice fishing rig assembly 10 of the present invention includes a tripod having legs 11. The legs of the tripod form a triangular base on the ice I.

The legs of the tripod are connected to each other through foldable straps 12, thereby allowing the legs of the tripod to be drawn together when the fishing rig or apparatus is in a stored position and positioning the legs in an extended position when the tripod is being used.

Mounted on the apex of the tripod 10 is a frame 17 to which is attached an open face semi-circular sleeve 13 in which section 14 of the drive rod assembly for the fishing rig is rotatably retained by a clamp 15.

The drive rod assembly 14 has mounted thereon a gear 16, which gear is engageable with a gear 28 within the reduction gear box 18, which is also attached to the frame 17.

The motive drive for the fishing rod comprises an electric motor 19, the said motor being mounted on the frame 17. Electricity from the storage battery 20 to the motor 19 is controlled through a switch 21. Wires 21$^a$ and 21$^b$ are connected to the storage battery 20, the switch 21 and the electric motor 19. The end of the rotor of the motor 19 has a gear 22 which intermeshes with a gear 23 on one end of a shaft 24. The other end of the shaft 24 has a similar gear 25 meshing with the ring gear 26.

Extending from the gear box 18 is a shaft 27 on the end of which is a gear 28 meshing with the ring gear 26. The shaft 27 of the gear box 18 has a gear 28$^a$ meshing with the gear 16 on the rod drive section 14. Thus motive power is furnished by the battery 20 to the rod drive section 14 of the drive rod assembly when the switch 21 is closed.

On the upper end of the drive assembly 14 is a detachable hand crank 29, the same furnishing an alternative manual control for revolving the fishing tackle under the ice.

The detachable crank handle 29 has an enlarged opening 29$^a$ on the other end removed from the hand hold in which the upper end of the drive rod section 14 enters for driving connection.

The lower end of the drive assembly section 14 has thereon an open sleeve 30 to receive the base end of the fishing rod 31. Near the tip 31$a$ or small end of the fishing rod 31 is a joint 32 pivotally connecting the upper section 33 of the fishing rod with the lower section 34, the lower section 34 of the fishing rod 31 being normally held at right angles to the section 33 by a tension spring 35.

Mounted on the sections 33 and 34 of the fishing rod 31 are conventional ferrules 36 through which the fishing line 37 plays backward or forward when the fishing line 37 is manipulated by the reel 38.

When the fishing apparatus is to be assembled over a previously formed hole H in the ice, it is only necessary to erect the tripod in a sturdy position so that the semi-circular sleeve 13 mounted on the frame 17 on the tripod is directly over the hole H in the ice and thereafter insert the drive mechanism, shown in FIG. 2, in the sleeve 13 on the tripod and retain the same in a locked position by the clamp 15, making certain that the gear 16 is engageable with the gear 28$^a$ retained within the gear box 18. Of course, the lower section 34 of the fishing rod 31 should be in an extended position in relation to the section 33 of the fishing rod 31 so that the same will enter the hole H in the ice rather than being in a retracted position shown in the drawings.

With the fishing rig or apparatus set up as above, the operator connects the wires 21$^a$ and 21$^b$ to the battery 20 and to the switch 21 and the electric motor 19. The operator then has the alternative means for driving the baited fishing line in a circular motion under the ice, either by the crank 29 or by closing the switch 21 thus energizing the electric motor 19 to revolve the fishing line under the ice.

Having thus described my invention, what I claim and desire to secure by U. S. Letters Patent is—

1. A fishing rig comprising a fishing rod having a large end and a tip, a tripod, a frame attached to the apex of the tripod, the same having mounted thereon a gear box, an electric motor and a semi-circular sleeve, a drive rod section rotatably mounted in the sleeve for rotation therein, means for retaining the drive rod section within the sleeve, and a gear on the rod section intermeshing with the gear in said gear box, said rod section having at its upper end a hand crank and at its lower end a socket in which the large end of said fishing rod is connected, said fishing rod having said tip at the end removed from the large end of the fishing rod and which is hingedly connected to the large end and a tension spring normally retaining the fishing rod at right angles to the large end of the rod.

2. The structure according to claim 1, in which said fishing rod has a reel having a fishing line thereon is mounted on the large end of the fishing rod adjacent the socket on the rod section.

3. The structure according to claim 2 in which the drive rod section, including the fishing rod, reel, and fishing line thereon, comprises a clamp removably connecting said drive rod section, including said fishing rod, reel and fishing line thereon, to the semi-circular sleeve mounted on the frame attached to the apex of the tripod.

References Cited by the Examiner
UNITED STATES PATENTS

| 2,122,836 | 7/38 | Gegerfeldt | 43—26.1 |
|---|---|---|---|
| 2,191,191 | 2/40 | Pealer | 77—6 X |
| 2,344,533 | 3/44 | Bruce | 43—19 |
| 2,643,478 | 6/53 | Paulsen | 43—19.2 |
| 2,732,543 | 1/56 | Mogren | 43—17 |
| 2,972,204 | 2/61 | Wollum | 43—19.2 |

ABRAHAM G. STONE, Primary Examiner.

F. RAY CHAPPELL, Examiner.